(12) United States Patent
Hsieh

(10) Patent No.: US 7,092,558 B2
(45) Date of Patent: Aug. 15, 2006

(54) AUTOMATED OPTIMIZATION OF MEDICAL 3D VISUALIZATIONS

(75) Inventor: Jiang Hsieh, Brookfield, WI (US)

(73) Assignee: General Electric Company, Schnectady, NY (US)

( * ) Notice: Subject to any disclaimer, the term of this patent is extended or adjusted under 35 U.S.C. 154(b) by 881 days.

(21) Appl. No.: 10/064,762

(22) Filed: Aug. 14, 2002

(65) Prior Publication Data
US 2004/0032978 A1    Feb. 19, 2004

(51) Int. Cl.
G06K 9/00 (2006.01)

(52) U.S. Cl. ..................... 382/131; 600/410

(58) Field of Classification Search ............. 382/131, 382/130, 132, 128; 128/922; 356/39; 600/410, 600/443; 378/8, 4; 324/309
See application file for complete search history.

(56) References Cited

U.S. PATENT DOCUMENTS

| | | | |
|---|---|---|---|
| 5,226,113 A * | 7/1993 | Cline et al. ............ | 345/424 |
| 5,954,653 A * | 9/1999 | Hatfield et al. ......... | 600/443 |
| 6,126,603 A * | 10/2000 | Hatfield et al. ......... | 600/454 |
| 6,193,657 B1 | 2/2001 | Drapkin | |
| 6,277,075 B1 | 8/2001 | Torp et al. | |
| 6,301,497 B1 | 10/2001 | Neustadter | |
| 6,320,928 B1 | 11/2001 | Vaillant | |
| 6,348,793 B1 | 2/2002 | Balloni | |
| 6,404,843 B1 | 6/2002 | Vaillant | |
| 6,404,853 B1 | 6/2002 | Odogba | |
| 6,406,430 B1 | 6/2002 | Ishrak | |
| 6,947,038 B1 * | 9/2005 | Anh et al. ............... | 345/419 |
| 6,948,931 B1 * | 9/2005 | Chishti et al. ........... | 433/24 |
| 6,979,196 B1 * | 12/2005 | Nikolskiy et al. ....... | 433/214 |
| 2004/0032978 A1 * | 2/2004 | Hsieh ...................... | 382/131 |

* cited by examiner

Primary Examiner—Matthew C. Bella
Assistant Examiner—Barry Choobin
(74) Attorney, Agent, or Firm—Peter Vogel

(57) ABSTRACT

A method of automatically optimizing medical three-dimensional visualizations is providing, including isolating a plurality of anatomical structures within the medical three-dimensional visualization (40), calculating the number of ray intersects, that intersect more than one of the plurality of anatomical structures, for a plurality of casting angles (42), selecting an optimum casting angle that minimizes said ray intersects from one of said plurality casting angles (44), and displaying the optimized medical three-dimensional visualization from said optimized casting angle (48).

21 Claims, 5 Drawing Sheets

AUTOMATED OPTIMIZATION OF MEDICAL 3D VISUALIZATIONS

BACKGROUND OF INVENTION

The present invention relates generally to a method and apparatus for medical imaging visualization, and more particularly, to a method and apparatus for automated optimization of medical three dimensional visualizations.

Medical imaging commonly utilizes medical scanning devices such as computed tomography (CT) and Magnetic Resonance Imaging (MRI) to produce two-dimensional images of anatomical structures. Groups of such two dimensional images, representing slices of the anatomical structure, can be analyzed in order for physicians to identify pathologies within the anatomical structure. Originally a physician was often required to analyze the plurality of slices in order to conceptually visualize the resulting three-dimensional structure.

With the introduction of advances such as multi-slice helical CT, routine clinical examinations can easily produce several hundred to over a thousand images per patient study. This can place significant limitations on the productivity of physicians and radiologists since examination of images slice by slice can take considerable time and can easily lead to fatigue. In order to accommodate such large numbers of images, medical imaging has turned to the use of three-dimensional visualization tools to assist physicians in examining these images.

A wide variety of three-dimensional visualization tools are presently available to facilitate examination of the images. Multi planar reformation (MPR), maximum intensity projection (MIP), volume rendering (VR), and surface rendering (SR) tools are just a few of the available visualization tools. These tools are capable of processing and displaying large quantities of information. Often, however, operators do not have the time to go through the entire volume of reconstructed data to determine the optimal parameters of the three-dimensional image generation. Commonly default sets of parameters are utilized to produce the MPR, MIP, VR, or SR images.

The predefined 3D image orientations and number of 3D images often leave significant room for improvement. Diagnostic quality can be significantly degraded by overlapped structures due to inappropriate selection of the 3D casting angles. Anatomical structures often cannot be clearly visualized in the resulting 3D image due to this overlapping. This often not acceptable for proper diagnosis. Although parameters may be adjusted and the number of 3D images may be modified, often such reconstruction may result in an undesirable expense of time and cost. Furthermore, reprocessing of the original two-dimensional data sets may become impractical or impossible if the original imaging data is archived or deleted. Clinical studies may find such reprocessing is not an available option.

It would therefore be highly desirable to have a three dimensional imaging apparatus and method that would automatically optimize the resulting three-dimensional visualization such that adequate 3D casting angles are utilized. It would further be beneficial for such an apparatus and method to optimize the number of 3D images produced such that an adequate visualization of the anatomical structure was provided.

SUMMARY OF INVENTION

It is, therefore, an object of the present invention to provide an apparatus and method for automatically optimizing a medical three-dimensional visualization such that adequate 3D casting angles are achieved. It is a further object of the present invention to provide an apparatus and method optimizing a medial three-dimensional visualization such that an adequate number of 3D images are produced. In accordance with the objects of the present invention, a method for automatically optimizing medical three-dimensional visualizations is provided. The method includes isolating a plurality of anatomical structures within the 3D visualization. Calculating the number of ray intersects intersecting more than one of said plurality of anatomical structures for a plurality of casting angles is then performed. Selecting a casting angle that minimizes said ray intersects to allow for the selection of an optimized three-dimensional visualization. Finally the optimized medical three-dimensional visualization is displayed from the selected casting angle. Other objects and features of the present invention will become apparent when viewed in light of the detailed description of the preferred embodiment when taken in conjunction with the attached drawings and appended claims.

DETAILED DESCRIPTION

Figure 1:
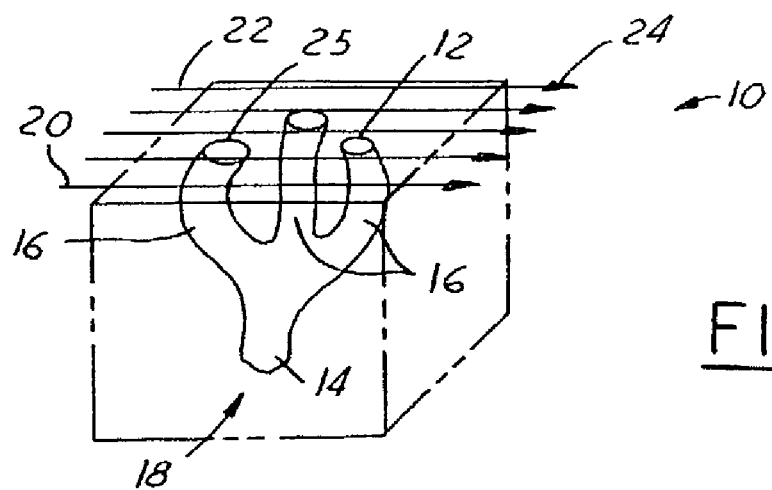
FIG. 1 is an illustration of a medical three-dimensional visualization illustrated in a non-optimized orientation.

Referring now to FIG. 1, which is an illustration of a medical three-dimensional visualization 10 in accordance with the present invention. The visualization 10 is intended to encompass any of a wide variety of three-dimensional visualizations known in the medical community including, but not limited to, MPR, MIP, VR, and SR visualizations. These visualizations are commonly reconstructed groupings of two-dimensional images 12 of anatomical image 14 created using CT, MR or other modalities. The anatomical image 14 commonly is comprised of a plurality of anatomical structures 16 such as the blood vessels filled with contrast medium 18 illustrated in FIGS. 1–3. Although blood vessels 18 have been utilized for illustrative purposes, it should be understood that the present invention is applicable to a wide rage of anatomical images 14 representing a wide variety of anatomical structures 16.

Figure 2:
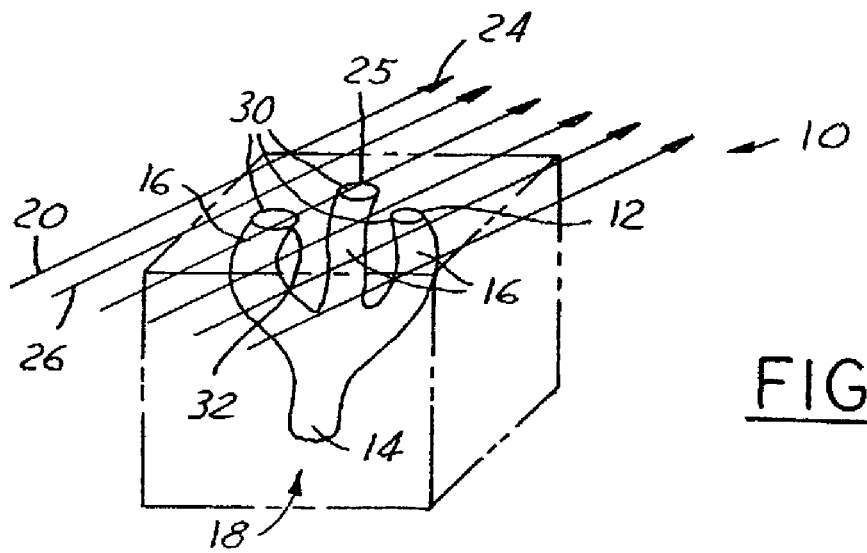
FIG. 2 is an illustration of a medical three-dimensional visualization illustrated in an optimized orientation.
Figure 3:
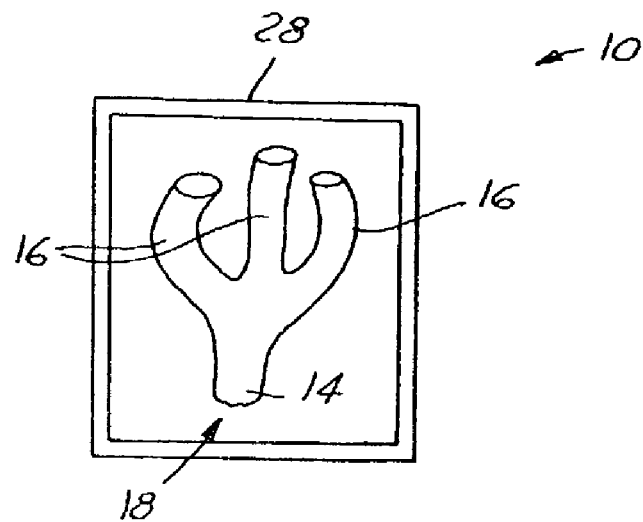
FIG. 3 is an illustration of the medical three-dimensional visualization illustrated in FIG. 2, the three-dimensional visualization rendered from the optimized casting angle.

When the resultant medical three-dimensional visualization 10 is displayed to an examining physician, it is illustrated from the perspective of a casting angle 20. The casting angle 20 illustrated in FIG. 1 is a non-optimized casting angle 22. It can be understood to be non-optimized because the casting rays 24 intersect the plurality of anatomical structures 16, creating ray intersects 25, such that they would undesirably overlap when viewed by the examining physician. Since the three vessels 18 are nearly co-planar from this non-optimized casting angle 20, the vessels 18 cannot be clearly visualized in the resulting three-dimensional visualization 10 due to the overlapping. The present invention selects an optimized casting angle 26 as illustrated in FIG. 2 such that the casting rays 24 intersect the plurality of anatomical structures 16 such that the resulting overlap of the three-dimensional visualization 10 is minimized. The three-dimensional visualization 10 can then be projected on a display 28 at this optimized casting angle 26 as illustrated in FIG. 3. It should be understood that although the figures utilize casting angles 20 orientated parallel to the reconstructed two-dimensional dataset, the orientation need not be limited to parallel planes. The casting angles may constitute oblique angles that pass through several reconstructed 2D images.

Figure 4:
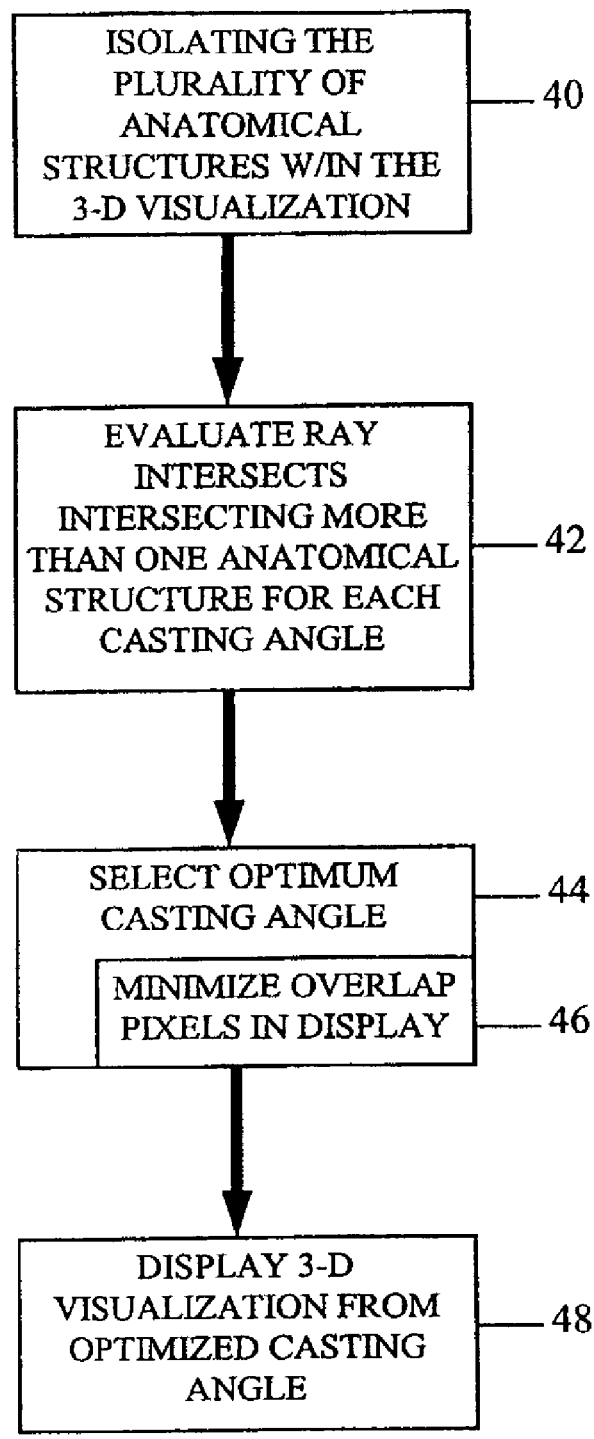
FIG. 4 is an illustration of a method of automatically optimizing a medical three-dimensional visualization in accordance with the present invention.

The present invention contemplates processing the three-dimensional visualization 10 automatically in order to optimize the casting angle 20. One embodiment of the methodology contemplated is illustrated in FIG. 4. The present invention begins by isolating the plurality of anatomical structures 16 within the three-dimensional visualization 10 (40). This can be performed through a variety of understood techniques. Simple thresholding or segmentation techniques are well understood methods for isolating anatomical structures 16 within images. Known segmentation techniques are also capable of automatically separating bony structures and separating them from the images. Once individual anatomical structures 30 are identified, a plurality of casting angles 26 can be evaluated.

The plurality of casting angles 20 are evaluated by calculating the number of ray intersects 25 intersecting more than one of said plurality of anatomical structures 16 for each casting angle 20 (42). In addition to the number of ray intersects 25, the amount of ray intersect 32 may also be calculated. The optimum casting angle 26 is then selected (44) based upon the least amount of overlapping by minimizing the number of ray intersects 25 intersecting more than one of the plurality of anatomical structures 16. Although this may be accomplished through a variety of methods and algorithms, one embodiment contemplates selection 44 based upon minimizing the number of overlapped pixels in the display 46. If $M_\alpha$ is the set of pixels that will result in overlapped 3D images of a particular casting angle α, and: $M_\alpha=[(x1,y1,z1),(x2,y2,z2),\square(xn,yn,zn)]$ where (xk, yk, zk) represents the x, y, and z coordinates of pixel k, k=1, □, n. Then the casting angle α should be selected such that it minimizes the set $M_\alpha$.

After selection 44, the optimized medical three-dimensional visualization can be displayed from the selected casting angle 48.

Figure 5:
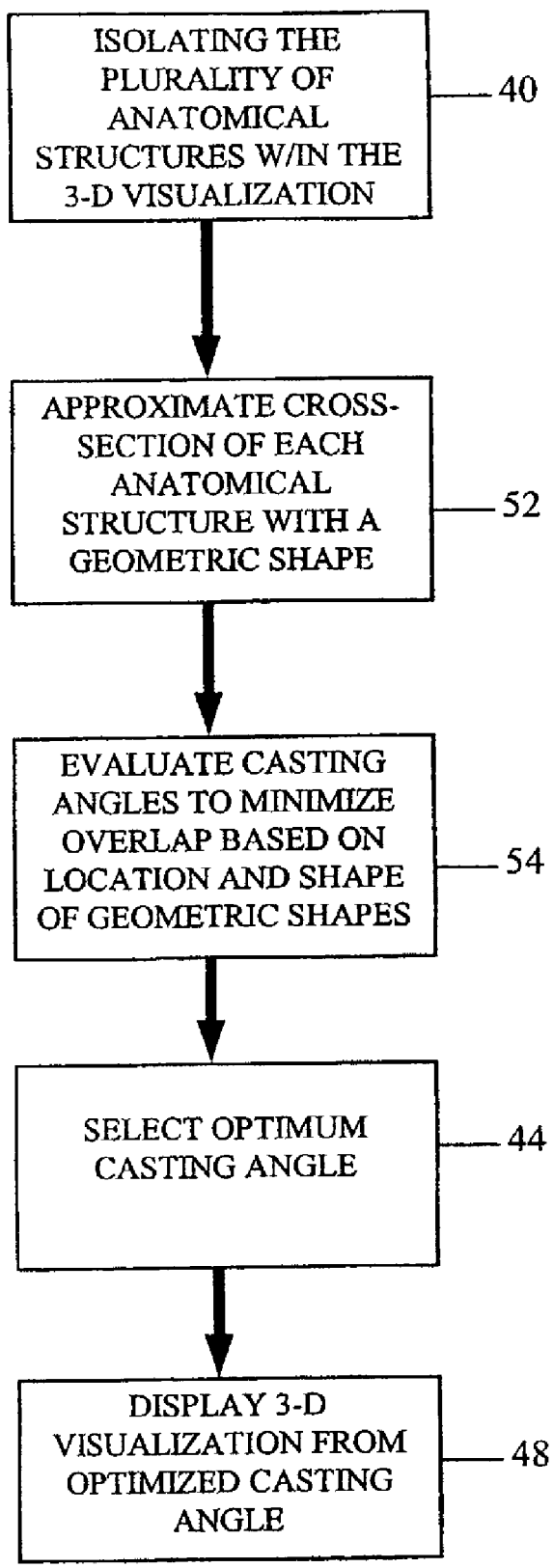
FIG. 5 is an illustration of an alternate embodiment of a method of automatically optimizing a medical three-dimensional visualization in accordance with the present invention.

An alternate approach is illustrated in FIG. 5. This approach makes use of the simple geometrical relationship of anatomical structure cross-sections 50 (see FIG. 2). Once the anatomical structures are identified and isolated 40, this embodiment approximates the cross-section of each anatomical structure with a simple geometrical shape 52. The geometrical shapes 52 of the illustrated blood vessels 18 are illustrated as ovals, although a variety of geometrical shapes 52 are contemplated for a variety of cross-sections. Based upon the shape and location of these geometrical shapes the amount of overlap can be determined analytically for each of the casting angles 54. The optimum casting angle can thereby be selected 44 as before based upon the minimization of overlap. Again, a wide variety of simple geometrical calculations can be utilized to make this selection 44. And again, after selection 44, the optimized medical three-dimensional visualization can be displayed from the selected casting angle 48.

Figure 6:
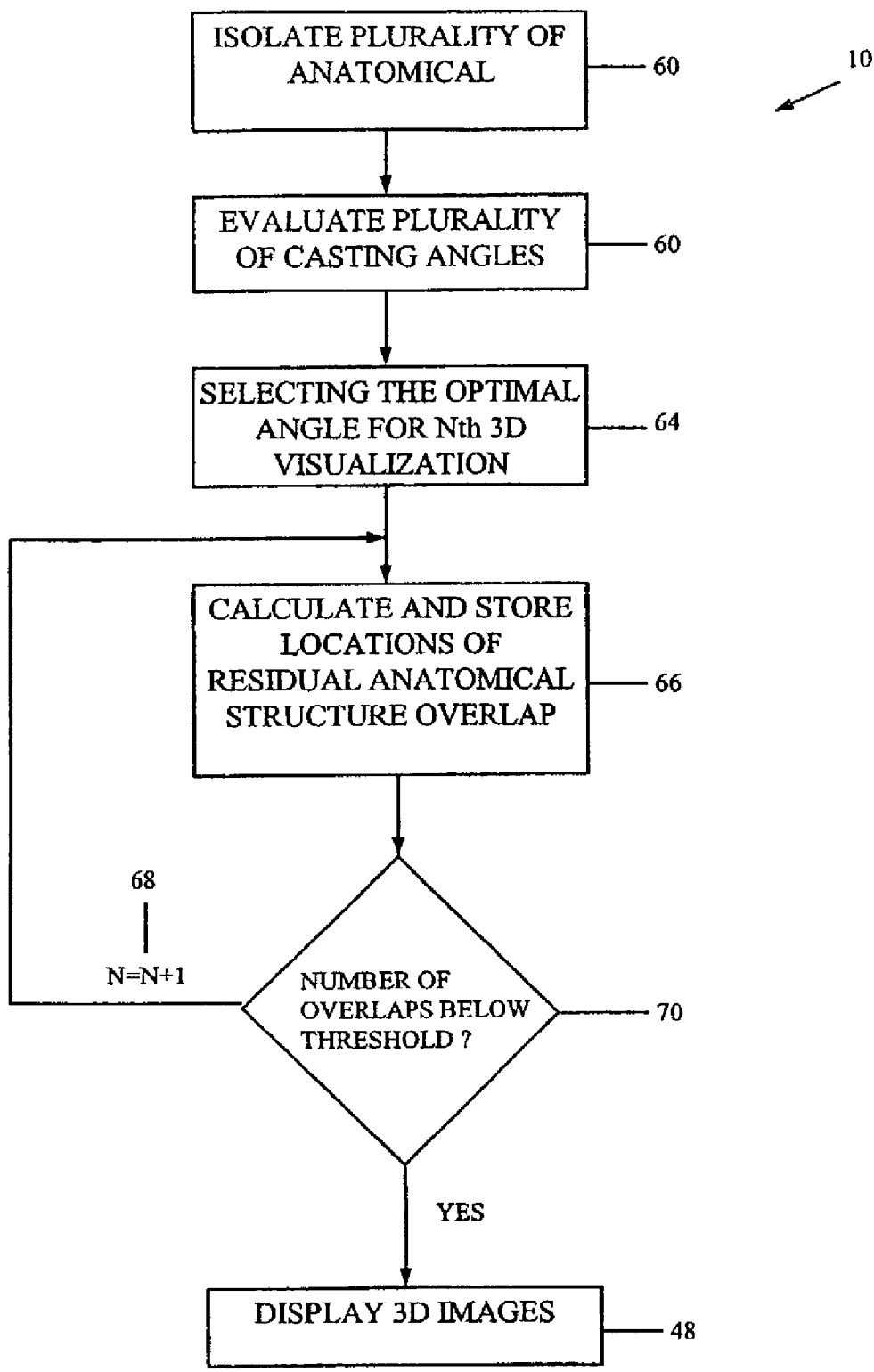
FIG. 6 is an illustration of a further embodiment of a method of automatically optimizing a medical three-dimensional visualization in accordance with the present invention.

It is contemplated that there may be circumstances and three-dimensional visualizations 10 that may be make it impossible or exceedingly difficult to produce a 3D image without any overlapping. In these cases, multiple three-dimensional visualizations 10 are recommended. The embodiment illustrated in FIG. 6 illustrates the present inventions preferable approach to such scenarios. This embodiment isolates the plurality of anatomical structures 60 and evaluates the plurality of casting angles 62 in either of the above identified methods, or in alternate variations. A first 3D visualization is selected based upon overall minimization of overlap 64 again as previously discussed. This embodiment, however, calculates and stores the locations of anatomical structure overlap 66. A second 3D visualization is then selected based upon a new casting angle that minimizes the number of overlaps in the region of previous overlap 68. In other words, if a minimized pixel approach is utilized, a new projection angle β should be selected such that it minimizes the overlaps in $M_\alpha$. The process can be repeated until the amount of overlap is less than a predetermined threshold 70.

Figure 7:
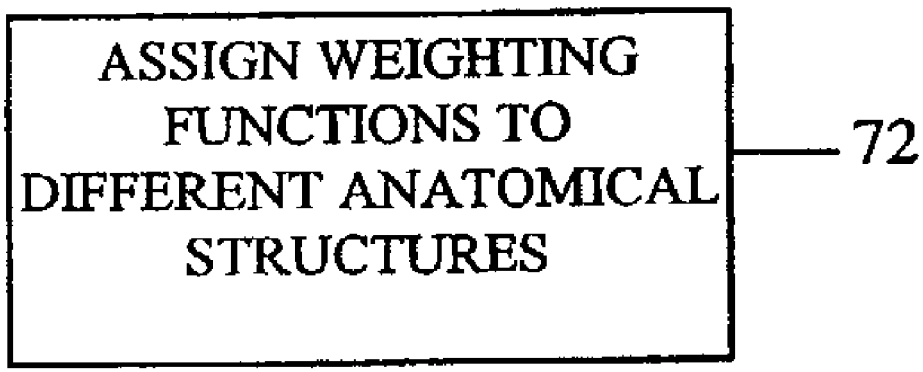
FIG. 7 is an illustration of an improvement to the embodiment of a method of automatically optimizing a medical three-dimensional visualization illustrated in FIG. 4.

Finally, although the previous discussions have approached the plurality of anatomical structures 16 as having equal importance, this is not always the case. As an example only, if the objective of the three-dimensional visualization 10 is to determine the viability of a kidney donor, anatomical structures 16 that are not part of the kidney structure will not carry the same weight as ones that do. Neighboring structures that might obstruct the view of the kidney itself may be deleterious as well. Therefore, the present invention contemplates an embodiment illustrated in FIG. 7. This embodiment includes the step of assigning weighting functions (or penalty function) to different anatomical structures 72. This can be utilized in a variety of fashions. Slight overlapping of large vessels may be less weighted than the same size overlapping of small vessels. Percentage of overlap may be utilized as a weighting factor for minimization. Other utilizations, as discussed may weight overlap of relevant structures higher than those of insignificant structures. In addition, it is contemplated that structures obstructing the weighted anatomical structures may be automatically removed from the display altogether. This embodiment can be utilized in conjunction with any of the disclosed embodiments. It adds a further improvement to automated visualization.

While particular embodiments of the invention have been shown and described, numerous variations and alternative embodiments will occur to those skilled in the arm. Accordingly, it is intended that the invention be limited only in terms of the appended claims.

The invention claimed is:

1. A method of automatically optimizing medical three-dimensional visualizations comprising:

isolating a plurality of anatomical structures within the medical three-dimensional visualization;

calculating the number of ray intersects, that intersect more than one of said plurality of anatomical structures, for a plurality of casting angles;

selecting an optimum casting angle that minimizes said ray intersects from one of said plurality casting angles; and displaying the optimized medical three-dimensional visualization from said optimized casting angle.

2. A method as described in claim 1, wherein said optimum casting angle is selected based upon minimizing the number of overlapped pixels in the three-dimensional visualization.

3. A method as described in claim 1, further comprising:
approximating a cross-section of each of said plurality of anatomical structures with a geometric shape; and
selecting the optimum casting angle based upon the location and shape of said geometric shapes.

4. A method as described in claim 1, further comprising:
calculating and storing the locations of anatomical structure overlap in the optimized medical three-dimensional visualization;
selecting a second casting angle that minimizes said locations of anatomical structure overlap; and
displaying a second three-dimensional visualization from said second casting angle.

5. A method as described in claim 1, further comprising:
weighting said ray intersects based upon an importance factor of each of said plurality of anatomical structures; and
selecting an optimum casting angle that minimizes said weighted ray intersects from one of said plurality casting angles.

6. A method as described in claim 1, further comprising:
automatically removing from the display lower weighted anatomical structures that destruct higher weighted anatomical structures.

7. A method as described in claim 1, further comprising:
weighting said ray intersects based upon the size of each of said plurality of anatomical structures; and
selecting an optimum casting angle that minimizes said weighted ray intersects from one of said plurality casting angles.

8. A method as described in claim 7, wherein said weighting of ray intersects is based upon percentage of overlap of each of said plurality of anatomical structures.

9. A method as described in claim 1, wherein said isolating is accomplished through the use of segmentation techniques.

10. A method as described in claim 1, wherein said isolating is accomplished through the use of thresholding techniques.

11. A method as described in claim 1, further comprising:
calculating the amount of ray intersect, for ray intersects that intersect more than one of said plurality of anatomical structures, for a plurality of casting angles.

12. A method of automatically optimizing medical three-dimensional visualizations comprising:
isolating a plurality of anatomical structures within the medical three-dimensional visualization;
calculating the number of overlaps of said plurality of anatomical structures, for a plurality of casting angles;
selecting an optimum casting angle that minimizes said number of overlaps from one of said plurality casting angles; and
displaying the optimized medical three-dimensional visualization from said optimized casting angle.

13. A method as described in claim 12, wherein said optimum casting angle is selected based upon minimizing the number of overlapped pixels in the three-dimensional visualization.

14. A method as described in claim 12, further comprising:
approximating a cross-section of each of said plurality of anatomical structures with a geometric shape; and
selecting the optimum casting angle based upon the location and shape of said geometric shapes.

15. A method as described in claim 12, further comprising:
calculating and storing the locations of anatomical structure overlap in the optimized medical three-dimensional visualization;
selecting a second casting angle that minimizes said locations of anatomical structure overlap; and
displaying a second three-dimensional visualization from said second casting angle.

16. A method as described in claim 12, further comprising:
weighting said overlaps based upon an importance factor of each of said plurality of anatomical structures; and
selecting an optimum casting angle that minimizes said weighted overlaps from one of said plurality casting angles.

17. A method as described in claim 12, further comprising:
weighting said overlaps based upon the size of each of said plurality of anatomical structures; and
selecting an optimum casting angle that minimizes said weighted overlaps from one of said plurality casting angles.

18. An apparatus of automatically optimizing medical three-dimensional visualizations comprising:
an isolating component, said isolating component isolating a plurality of anatomical structures within the medical three-dimensional visualization;
a calculator component for calculating the number of overlaps of said plurality of anatomical structures, for a plurality of casting angles;
a selector component, said selector component selecting an optimum casting angle that minimizes said number of overlaps from one of said plurality casting angles; and
a display element for displaying the optimized medical three-dimensional visualization from said optimized casting angle.

19. An apparatus as described in claim 18, further comprising:
a geometric approximator for approximating a cross-section of each of said plurality of anatomical structures with a geometric shape.

20. An apparatus as described in claim 18, further comprising:
a weighting component, said weighting component weighting said overlaps based upon the size of each of said plurality of anatomical structures.

21. An apparatus as described in claim 18, further comprising:
a weighting component, said weighting component weighting said overlaps based upon an importance factor of each of said plurality of anatomical structures.

* * * * *